United States Patent
Omori

(10) Patent No.: US 8,089,490 B2
(45) Date of Patent: Jan. 3, 2012

(54) CORRECTION ARITHMETIC CIRCUIT

(75) Inventor: Nobuhiko Omori, Gyoda (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 611 days.

(21) Appl. No.: 12/249,553

(22) Filed: Oct. 10, 2008

(65) Prior Publication Data

US 2009/0096805 A1 Apr. 16, 2009

(30) Foreign Application Priority Data

Oct. 11, 2007 (JP) ................................ 2007-265570

(51) Int. Cl.
*G09G 5/02* (2006.01)
(52) U.S. Cl. .................. 345/591; 345/601; 345/602
(58) Field of Classification Search .................. 345/601, 345/602, 603, 604, 605, 606
See application file for complete search history.

(56) References Cited

U.S. PATENT DOCUMENTS

| | | | |
|---|---|---|---|
| 5,951,625 A | 9/1999 | Duvanenko et al. | |
| 7,466,463 B2 * | 12/2008 | Kondo | 358/504 |
| 7,535,476 B2 * | 5/2009 | Tang et al. | 345/602 |
| 7,834,889 B2 * | 11/2010 | Mizoguchi | 345/606 |
| 7,924,291 B2 * | 4/2011 | Marcu et al. | 345/602 |
| 2004/0046767 A1 * | 3/2004 | Cloutier | 345/600 |

FOREIGN PATENT DOCUMENTS

| | | |
|---|---|---|
| JP | 7220048 A | 8/1995 |
| JP | 11085964 A | 3/1999 |
| JP | 2000-338935 A | 12/2000 |
| JP | 2003-069857 A | 3/2003 |
| JP | 2004-120366 A | 4/2004 |
| JP | 2005-323137 | 11/2005 |

OTHER PUBLICATIONS esp@cenet patent abstract for Japanese Publication No. 2005323137, Publication date Nov. 17, 2005 (1 page).
Japanese Office Action for Application No. 2007-265570, mailed on Aug. 2, 2011 (4 pages).
esp@cenet Patent Abstract for Japanese Publication No. 11085964, publication date Mar. 30, 1999. (1 page).
esp@cenet Patent Abstract for Japanese Publication No. 7-220048, publication date Aug. 18, 1995. (1 page).
esp@cenet Patent Abstract for Japanese Publication No. 2004-120366, publication date Apr. 15, 2004. (1 page).
esp@cenet Patent Abstract for Japanese Publication No. 2000-338935, publication date Dec. 8, 2000. (1 page).
esp@cenet Patent Abstract for Japanese Publication No. 2003-069857, publication date Mar. 7, 2003. (1 page).

\* cited by examiner

*Primary Examiner* — Kee M Tung
*Assistant Examiner* — Leon T Cain, II
(74) *Attorney, Agent, or Firm* — Osha • Liang LLP

(57) ABSTRACT

A plurality of one-port split lookup tables having alternately stored therein correction data corresponding to input data is provided as a lookup table that has stored therein the correction data corresponding to the input data at predetermined intervals relevant to predetermined higher-order bits. An address generating unit generates addresses for a plurality of the corresponding split lookup tables from the input data. An interpolation arithmetic unit executes interpolation arithmetic with the use of lower-order bits of the input data for readout data read from two lookup tables.

4 Claims, 5 Drawing Sheets

CORRECTION ARITHMETIC CIRCUIT

CROSS-REFERENCE TO RELATED APPLICATION

The entire disclosure of Japanese Patent Application No. 2007-265570 filed on Oct. 11, 2007 including specification, claims, drawings, and abstract is incorporated herein by reference.

BACKGROUND OF THE INVENTION

1. Field of the Invention

The present invention relates to a correction arithmetic circuit that utilizes a lookup table having stored therein correction data corresponding to input data at predetermined intervals relevant to predetermined higher-order bits.

2. Description of the Related Art

Conventionally, the gamma correction is executed based on gamma curves when video signals are displayed. The correction using gamma curves utilizes a lookup table. When a lookup table is utilized, a required memory capacity becomes very large if all the correction data corresponding to input data are stored. Therefore, the lookup table has stored therein the correction data for the input data at predetermined intervals. Although the correction data may be read and output if the correction data for the input are saved, the data must be saved and interpolation arithmetic must be executed to acquire video data after the gamma correction if the data are not stored.

Therefore, two adjacent correction data must be output for one item of input data from the lookup table. As a result, two addresses are generated and adjacent correction data are output for one item of input data. For example, it is assumed that input data have eight bits and that correction data corresponding to the high five bits of the input data are stored in the lookup table. In this case, two addresses are generated, which are an address 1 corresponding to the high five bits of the input data and an address 2 corresponding to a value of the high five bits +1, and correction data of these two addresses are output from the lookup table.

Therefore, a two-port memory is utilized as the lookup table to acquire two output data by concurrently specifying two addresses.

Related arts include Japanese Patent Application Laid-Open Publication No. 2005-323137.

However, since a two-port memory needs a circuit for concurrent access, it is problematic that an area of the lookup table is increased.

SUMMARY OF THE INVENTION

The present invention comprises a lookup table that has stored therein correction data corresponding to input data at predetermined intervals relevant to predetermined higher-order bits, the lookup table having a plurality of one-port split lookup tables having alternately stored therein the correction data corresponding to the input data, an address generating unit that generates addresses for a plurality of the corresponding split lookup tables from the input data, and an interpolation arithmetic unit that executes interpolation arithmetic with the use of lower-order bits of the input data for readout data read from the plurality of the split lookup tables through the generated addresses.

According to the present invention, since one-port lookup tables are used, an efficient correction arithmetic circuit may be acquired with a smaller area as a whole.

DESCRIPTION OF THE PREFERRED EMBODIMENTS

An exemplary embodiment of the present invention will hereinafter be described with reference to the drawings.

Figure 1:
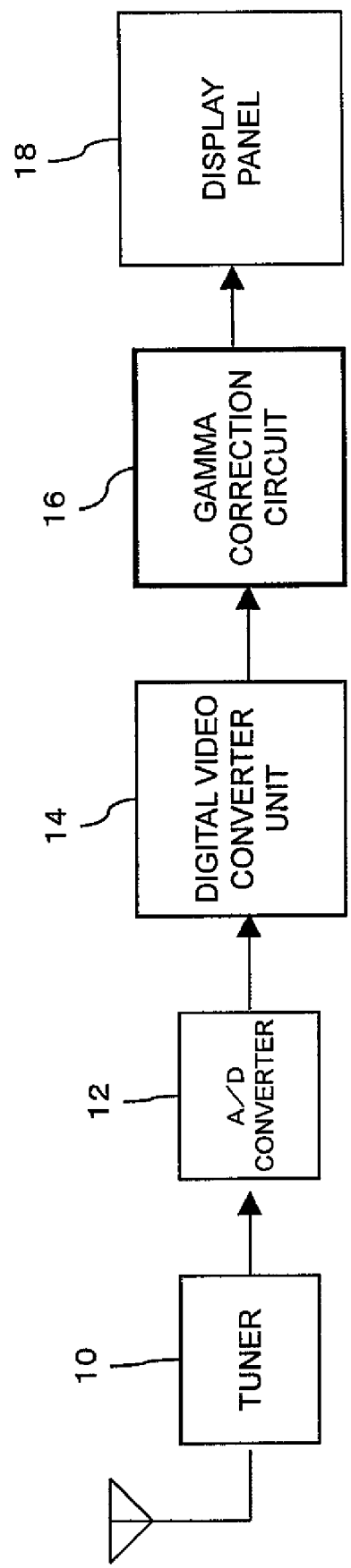
FIG. 1 depicts an overall configuration of a system.

FIG. 1 depicts an overall configuration of a system. An antenna receives television broadcasting, and a tuner 10 receives and processes received electric waves to acquire analogue video signals. An A/D converter 12 converts the analogue video signals into digital video data, which are supplied to a digital video conversion circuit 14. The digital video conversion circuit 14 executes a process for conversion into data to be supplied to a display panel as well as various processes for contrast, brightness, color balance, etc.

The output of the digital video conversion circuit 14 is supplied to a gamma correction circuit 16. The gamma correction circuit 16 performs gamma correction for the supplied video data such that the display on the display panel is recognized as correct gradation by a viewer. The output of the gamma correction circuit 16 is supplied to and displayed by a display panel 18.

Figure 2:
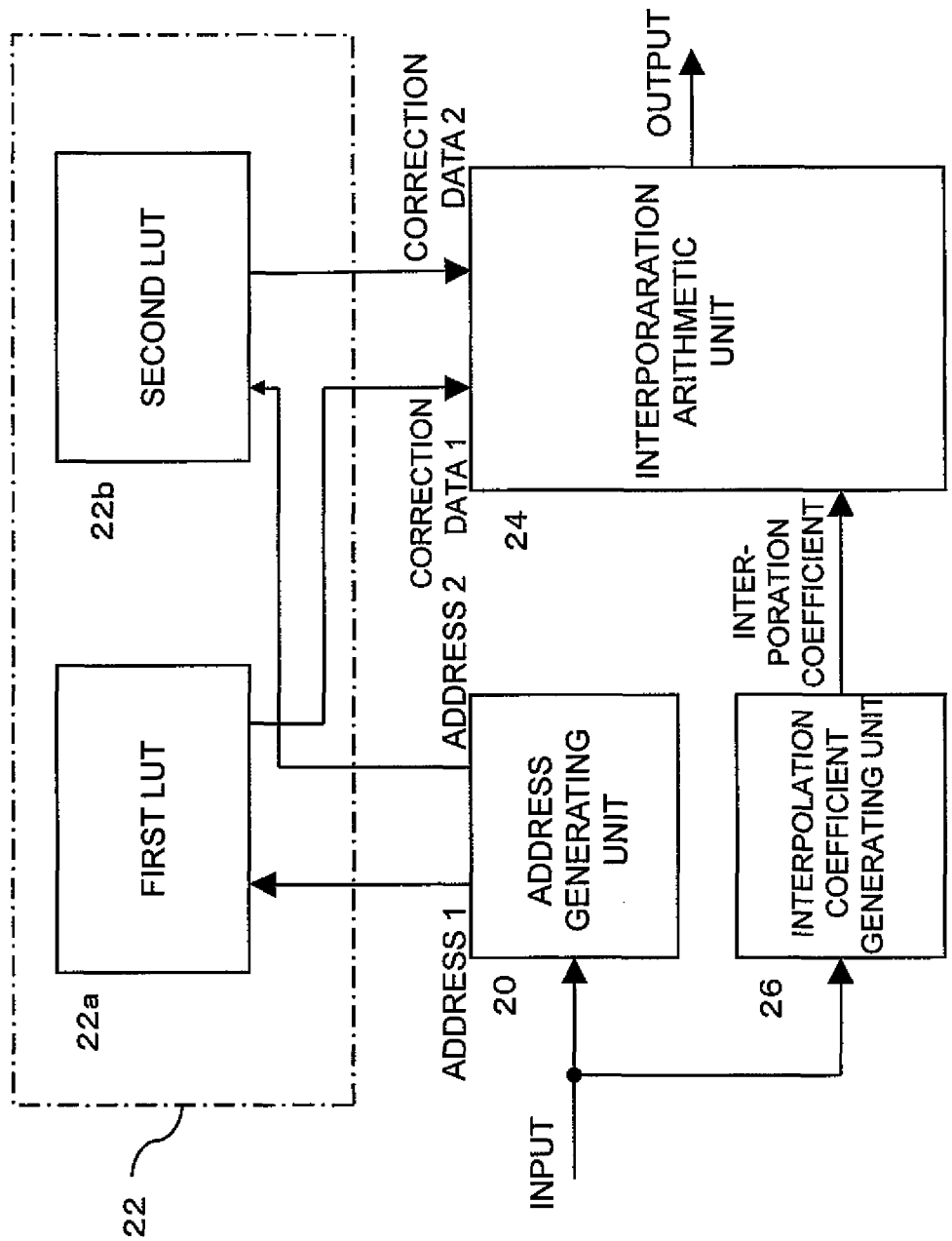
FIG. 2 depicts a configuration of a gamma correction circuit.

FIG. 2 depicts a configuration of the gamma correction circuit 16. Video data (input data) are the output of the digital video conversion circuit 14 and are supplied to an address generating unit 20. The address generating unit 20 generates two address data (address 1 and address 2) based on the input data. The addresses 1 and 2 are supplied to a lookup table. A lookup table 22 includes split lookup tables, which are a first LUT 22a and a second LUT 22b, and the address 1 and the address 2 are supplied to the first LUT 22a and the second LUT 22b, respectively. The outputs from the first and second LUTs 22a and 22b are supplied as two correction data to an interpolation arithmetic unit 24.

The input data are also supplied to an interpolation coefficient generating unit 26. The interpolation coefficient generating unit 26 generates an interpolation coefficient from a value of lower-order bits of the input data and supplies the interpolation coefficient to the interpolation arithmetic unit 24. The interpolation arithmetic unit 24 executes the interpolation arithmetic based on the two correction data supplied from the lookup table 22 and the interpolation coefficient supplied from the interpolation coefficient generating unit 26 to output interpolated data.

Figure 3:
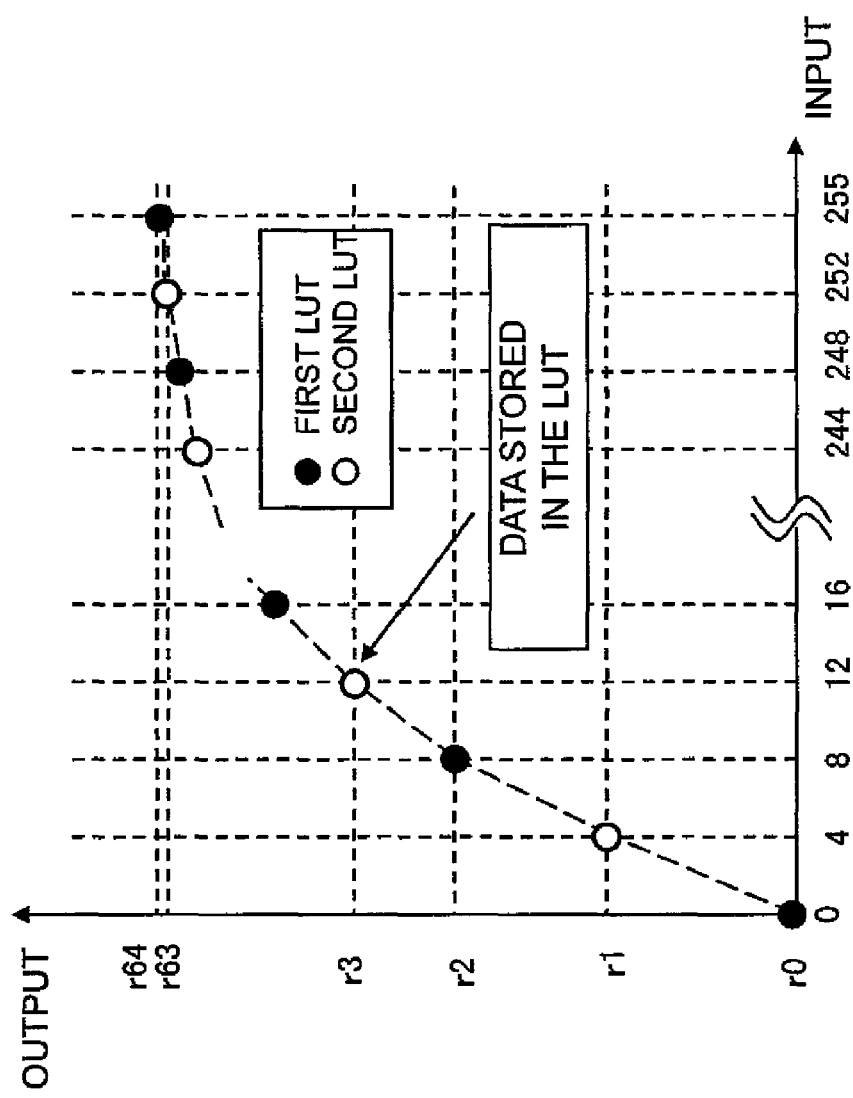
FIG. 3 depicts contents of a lookup table.

FIG. 3 depicts the correction data stored in the lookup table 22. If the input data are eight-bit data, the correction data corresponding to the high-five-bit data are stored in the lookup table 22. In this example, correction data r1, r2, r3, ... r63 corresponding to 0, 4, 8, 12, ... 252 of the input data are stored in the lookup table 22. The even-numbered correction data r0, r2, ... corresponding to 0, 8, ... indicated by ● in FIG. 3 are stored in the first LUT 22a, and the odd-numbered correction data r1, r3, ... corresponding to 4, 12, ... indicated by ○ in FIG. 3 are stored in the second LUT 22b. That is, r0, r2, r4, ... r62 are stored in addresses 0, 1, 2, ... 31 of the first LUT 22a, and r1, r3, r5, ... r63 are stored in addresses 0, 1, 2, ... 31 of the second LUT 22b.

The interpolation arithmetic requires two correction data corresponding to two data sandwiching the input data. Therefore, the address generating unit 20 generates the addresses 1 and 2 for the input data as follows.

(i) If the bit [2] of the input data is zero, the address 1=the high five bits of the input and the address 2=the high five bits of the input are defined.

(ii) If the bit [2] of the input data is one, the address 2=the high five bits of the input and the address 1=the high five bits of the input +1 are defined.

When such addresses are generated, for example, if the input data are "11", the input is "00001011". Therefore, since bit[2]=0, the address 1=1 (correction data 1=r2) and the address 2=1 (correction data 2=r3) are defined. In the case of "14", the input is "00001110". Therefore, since bit[2]=1, the address 1=2 (correction data 1=r4) and the address 2=1 (correction data 2=r3) are defined.

As above, although the addresses of the first and second LUTs 22a and 22b are specified by the higher-order bits, the lower-order bit value is used to control whether both addresses are made identical or shifted by one to generate two readout addresses.

The interpolation coefficient generating unit 26 generates an interpolation coefficient depending on a value of the low three bits. For example, the value may be obtained by dividing a value of the low three bits by "111" or may be approximated through a quadratic curve. The interpolation arithmetic unit 24 divides a difference between two correction data by the interpolation coefficient from the interpolation coefficient generating unit 26 to acquire and output the interpolated data.

According to the present embodiment, two one-port LUTs 22a, 22b are used. The one-port memory has one port and enables efficient wiring, etc., and providing two one-port memories can make the area smaller. The one-port memories are widely used general-purpose memories, efficiently designed in many cases, and inexpensive.

The two LUTs 22a and 22b may efficiently be accessed by only generating addresses in the address generating unit 20 as above.

Figure 4:
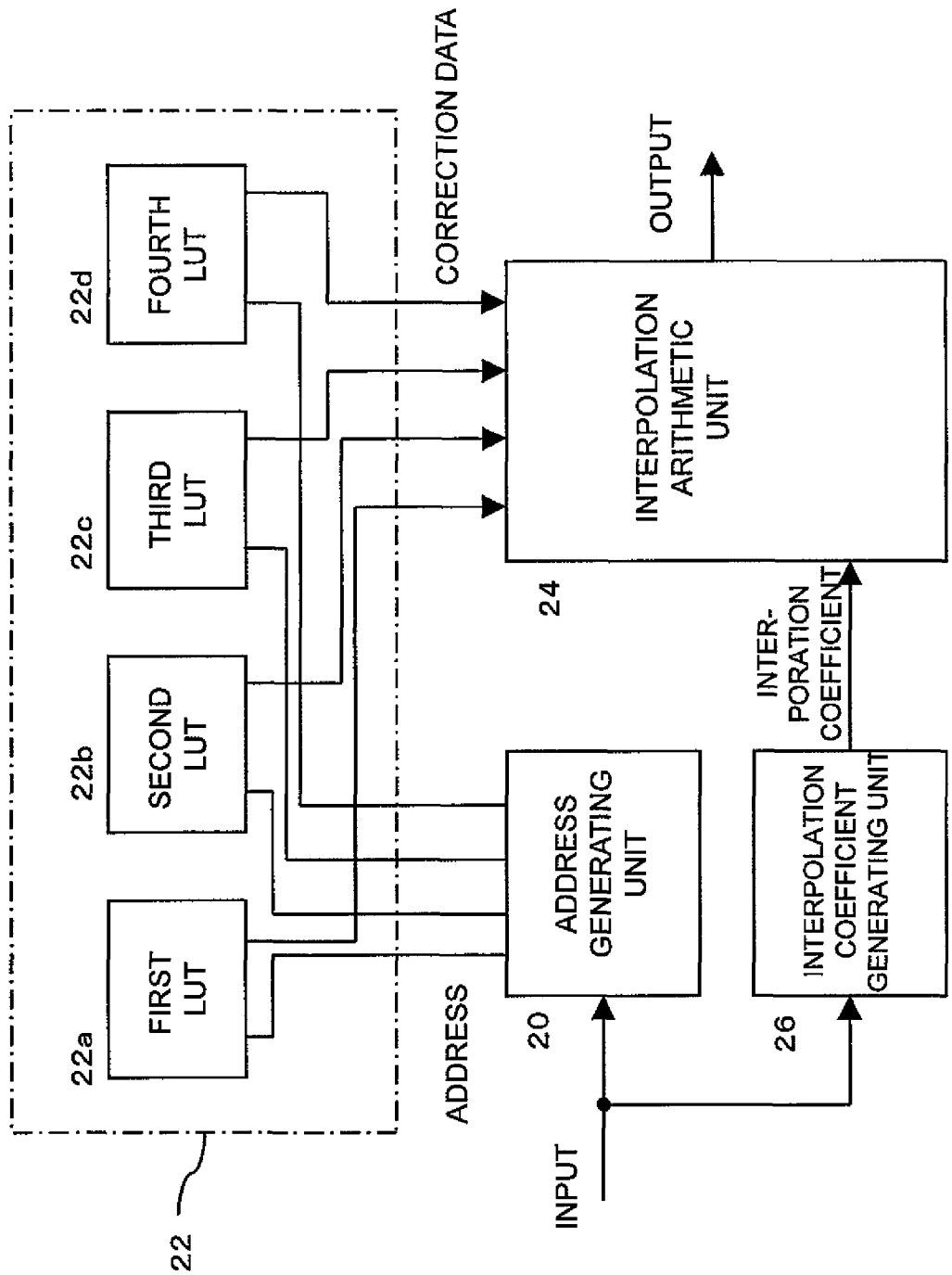
FIG. 4 depicts an exemplary configuration of another gamma correction circuit.
Figure 5:
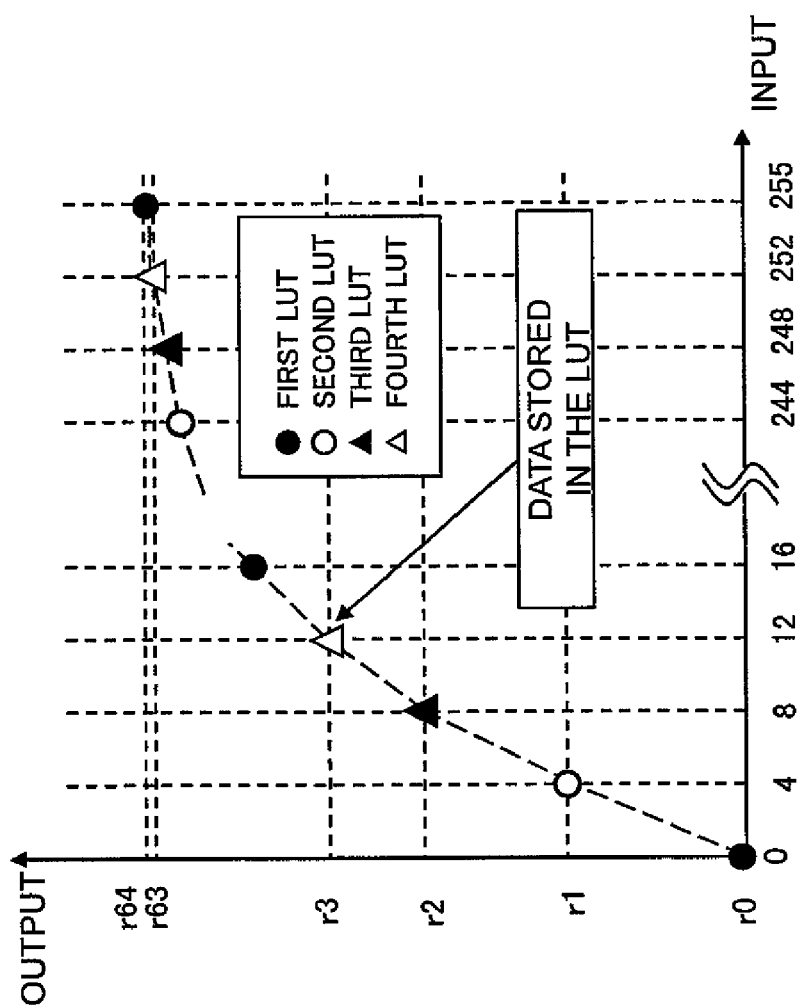
FIG. 5 depicts contents of a lookup table.

Three or more one-port LUTs 22 may also preferably be provided. FIG. 4 depicts an example of providing four one-port LUT (first to fourth LUTs) 22a to 22d. In this example, the address generating unit 20 generates addresses of the first to fourth LUTs 22a to 22d depending on one item of input data. As a result, four gamma-converted correction data close to the one item of input data are acquired from the outputs of the first to fourth LUTs 22a to 22d. Although linear interpolation is basically performed in the case of interpolation based on two items of data for one input, second-order interpolation is enabled if four items of data exist. For example, if input data are eight-bit and correction data are input every four bits of the input data, the correction data are stored in the first to fourth LUTs 22a to 22d every four bits of the input data as shown in FIG. 5. Therefore, as shown in Table 1 below, corresponding correction data are respectively stored at addresses 0 to 15 determined by the high four bits as shown in Table 1.

TABLE 1

The address generating unit 20 generates the following addresses in accordance with Table 1.

When a bit [3:2] of the input (which means three bits - two bits, assuming that LSB is zero bit) is zero:
    the address of the first LUT 22a = the high four bits of the input;

TABLE 1-continued

The address generating unit 20 generates the following addresses in accordance with Table 1.

the address of the second LUT 22b = the high four bits of the input;
    the address of the third LUT 22c = the high four bits of the input; and
    the address of the fourth LUT 22d = the high four bits of the input.
When a bit [3:2] of the input is one:
    the address of the first LUT 22a = the high four bits of the input +1;
    the address of the second LUT 22b = the high four bits of the input;
    the address of the third LUT 22c = the high four bits of the input; and
    the address of the fourth LUT 22d = the high four bits of the input.
When a bit [3:2] of the input is two:
    the address of the first LUT 22a = the high four bits of the input +1;
    the address of the second LUT 22b = the high four bits of the input +1;
    the address of the third LUT 22c = the high four bits of the input; and
    the address of the fourth LUT 22d = the high four bits of the input.
When a bit [3:2] of the input is three:
    the address of the first LUT 22a = the high four bits of the input +1;
    the address of the second LUT 22b = the high four bits of the input +1;
    the address of the third LUT 22c = the high four bits of the input +1; and
    the address of the fourth LUT 22d = the high four bits of the input.

The four correction data corresponding to the input data are generated from the first to fourth LUTs 22a to 22d as a result of the above address generation and are supplied to the gamma interpolation arithmetic unit 24. Therefore, the gamma interpolation arithmetic unit 24 may perform the interpolation arithmetic with the use of four correction data. If one item of correction data corresponds to the eight-bit input data, only the corresponding data may be output. Although it is preferable to perform interpolation from four correction data corresponding to two preceding data and two subsequent data adjacent to the input data, the numbers of the preceding and subsequent data may not be the same.

By changing the readout address depending on a value of the low four bits, i.e., [3-2] bits even if values of the high four bits are the same, four correction data centering on the input data may always be acquired and used to enable the interpolation arithmetic.

What is claimed is:

1. A correction arithmetic circuit comprising:
a lookup table that has stored therein correction data corresponding to input data at predetermined intervals relevant to predetermined higher-order bits of the input data, the lookup table having a plurality of one-port split lookup tables having alternately stored therein the correction data corresponding to the input data;
an address generating unit that generates addresses for the one port split lookup tables from the higher-order bits of the input data, wherein the addresses for the one port split lookup tables are for readout of the correction data before and after the input data; and
an interpolation arithmetic unit that executes interpolation arithmetic with the use of lower-order bits of the input data for the correction data read from the plurality of the split lookup tables through the generated addresses.

2. The correction arithmetic circuit of claim 1, wherein the input data is video data, and wherein the interpolation arithmetic unit acquires video data after gamma correction.

3. The correction arithmetic circuit of claim 1, wherein
the lookup table includes two split lookup tables that are a first lookup table having odd-numbered correction data stored therein and a second lookup table having even-numbered correction data stored therein, and wherein the address generating unit changes whether readout addresses of the first lookup table and the second lookup table are made identical or different depending on a level of the lower-order bits.

4. The correction arithmetic circuit of claim 3, wherein the input data is video data, and wherein the interpolation arithmetic unit acquires video data after gamma correction.

* * * * *